United States Patent
Xu

(10) Patent No.: US 9,886,123 B2
(45) Date of Patent: Feb. 6, 2018

(54) IN- CELL CAPACITIVE TOUCH SCREEN PANEL APPARATUS AND DRIVING METHOD

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 112 days.

(21) Appl. No.: 14/787,524

(22) PCT Filed: Jun. 10, 2015

(86) PCT No.: PCT/CN2015/081180
§ 371 (c)(1),
(2) Date: Oct. 28, 2015

(87) PCT Pub. No.: WO2016/150010
PCT Pub. Date: Sep. 29, 2016

(65) Prior Publication Data
US 2017/0108974 A1    Apr. 20, 2017

(30) Foreign Application Priority Data

Mar. 24, 2015  (CN) .......................... 2015 1 0130630

(51) Int. Cl.
*G06F 3/045* (2006.01)
*G06F 3/041* (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
CPC ......... G06F 2203/04112; G06F 3/0412; G06F 3/0416; G06F 3/044; G02F 1/13338;
(Continued)

(56) References Cited

U.S. PATENT DOCUMENTS

2014/0146009 A1* 5/2014 Huang .................... G06F 3/044
345/174
2014/0320427 A1* 10/2014 Lee ........................ G06F 3/0416
345/173

* cited by examiner

*Primary Examiner* — Insa Sadio
(74) *Attorney, Agent, or Firm* — Andrew C. Cheng

(57) ABSTRACT

The present invention discloses a driving method for an in-cell capacitive touch screen panel comprising: providing a common electrode voltage for image display to the common electrodes and each even-numbered one of the touch driving electrodes, and providing a touch driving voltage for touch driving to each odd-numbered one of the touch driving electrodes within a touch drive time period of a N-th image frame display time period; providing the common electrode voltage to the common electrodes and each odd-numbered one of the touch driving electrodes, and providing the touch driving voltage to each even-numbered one of the touch driving electrodes within a touch drive time period of a (N+1)-th image frame display time period. The present invention further provides a in cell capacitive touch screen panel.

4 Claims, 2 Drawing Sheets

(51) Int. Cl.
*G06F 3/044* (2006.01)
*G02F 1/1333* (2006.01)
*G02F 1/1343* (2006.01)
*G02F 1/1335* (2006.01)

(52) U.S. Cl.
CPC ............ *G06F 3/044* (2013.01); *G06F 3/0412* (2013.01); *G02F 1/133512* (2013.01); *G02F 1/133514* (2013.01); *G02F 2201/121* (2013.01)

(58) Field of Classification Search
CPC ......... G02F 1/133512; G02F 1/133514; G02F 1/134309; G02F 2201/121
See application file for complete search history.

IN-CELL CAPACITIVE TOUCH SCREEN PANEL APPARATUS AND DRIVING METHOD

TECHNICAL FIELD

The invention relates to a touch screen panel technology field, and more particularly, to an in-cell capacitive touch screen panel and a driving method thereof.

BACKGROUND

Touch screen panel is an input device, which enable users could input users' instructions by choosing the instructions on panel, such as an image display, by fingers or objects. Users' fingers or objects could directly touch the touch screen panel. The applicable fields are increasing nowadays because this kind of touch screen panel could substitute for a keyboard or mouse of a single input device in connecting to an image display.

A touch unit is integrated into a screen display in In-cell touch screen panel so that the screen panel includes touchable functions. In-cell touch screen panel is a touch control unit manufacture which can be achieved in standards procedure without any problems of lamination or alignment, but further has the advantage of being even lighter, slimmer, frameless, full-flatplane-design-achieving and etc.; moreover, it is a hot point in present research of touch screen panel area.

In in-cell touch screen panel, in-cell touch functions are usually achieved by performing time division multiplex access on the common electrodes. A specific process is as following: an image frame display time period is divided into a display driving time period and a touch drive time period; wherein, all the common electrodes are to be provided with a common electrode voltage of image displaying within the touch drive time period; the common electrodes participating into touch driving are to be provided with the touch driving voltage of touch driving within the touch drive time period, but the common electrodes not participating into touch driving are still to be provided with the common electrode voltage of image displaying within the touch drive time period so that the functions of image displaying and touch driving can be implemented.

An image area corresponding to the common electrodes not participating into touch driving displays well due to the common electrodes are to be provided with the common electrode voltage of image displaying within the touch drive time period, but an image area corresponding to the common electrodes participating into touch driving does not display well due to the touch driving voltage of the common electrodes are higher than the common electrode voltage within the touch drive time period. When consecutive frames are displayed, the common electrodes corresponding to the area are to be provided with the touch driving voltage, which causes a non-uniform image displaying. At the same time, aging rate of liquid crystal molecules of the area corresponding to the common electrodes is increased because the common electrodes are consecutively to be provided with the touch driving voltage.

DISCLOSURE OF INVENTION

The invention provides an in-cell capacitive touch screen panel apparatus and driving method to solve the above problems in the related arts.

According to another aspect of the present invention, it provides a driving method for an in-cell capacitive touch screen panel. The in-cell capacitive touch screen panel comprises a plurality of common electrodes and a plurality of touch driving electrodes extending in a first direction. The driving method includes: providing a common electrode voltage for image display to the common electrodes and each even-numbered one of the touch driving electrodes, and providing a touch driving voltage for touch driving to each odd-numbered one of the touch driving electrodes within a touch drive time period of a N-th image frame display time period; providing the common electrode voltage to the common electrodes and each odd-numbered one of the touch driving electrodes, and providing the touch driving voltage to each even-numbered one of the touch driving electrodes within a touch drive time period of a (N+1)-th image frame display time period.

Furthermore, the touch driving voltage is higher than the common electrode voltage.

Furthermore, providing the common electrode voltage to all the common electrodes and the touch driving electrodes within a display driving time of the N-th image frame display time period.

Furthermore, providing the common electrode voltage to all the common electrodes and the touch driving electrodes within a display driving time of the (N+1)-th image frame display time period.

According to another aspect of the present invention, it provides an in-cell capacitive touch screen panel comprises comprising a plurality of common electrodes and a plurality of touch driving electrodes extending in a first direction, wherein, the common electrodes and each even-numbered one of the touch driving electrodes are to be provided with a common electrode voltage of image displaying within a N-th image frame display time period, and each odd-numbered one of the touch driving electrodes are to be provided with a touch driving voltage of touch driving within a touch drive time period of a N-th image frame display time period; the common electrodes and each odd-numbered one of the touch driving electrodes are to be provided with the common electrode voltage within a (N+1)-th image frame display time period, and each even-numbered one of the touch driving electrodes are to be provided with the touch driving voltage within a touch drive time period of a (N+1)-th image frame display time period.

Furthermore, the touch driving voltage is higher than the common electrode voltage.

Furthermore, the common electrodes and the touch driving electrodes are all provided with the common electrode voltage within a display driving time of the N-th image frame display time period.

Furthermore, the common electrodes and the touch driving electrodes are all provided with the common electrode voltage within a display driving time of the (N+1)-th image frame display time period.

The in-cell capacitive touch screen panel apparatus and driving method of the invention solve a non-uniform image displaying problem and avoid aging rate of liquid crystal molecules of the area corresponding to the touch driving electrodes being increased through alternately providing the touch driving voltage to each odd-numbered the touch driving electrodes and each even-numbered the touch driving electrodes within the touch drive time period of a neighboring image frame display time period.

BRIEF DESCRIPTION OF THE DRAWINGS

The advantages and features and a way of attaining them will become apparent with reference to embodiments described below in detail in conjunction with the accompanying drawings.

DETAILED DESCRIPTION OF THE PREFERRED EMBODIMENTS

Figure 1:
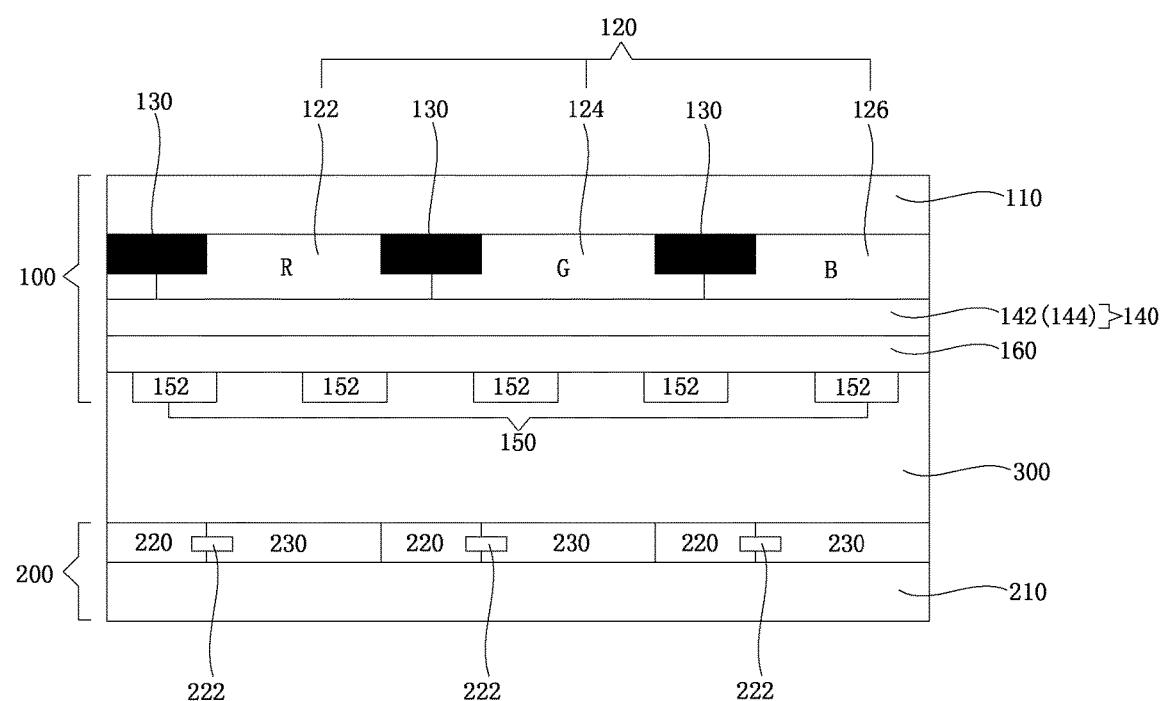
FIG. 1 is a schematic structural view of an in-cell capacitive touch screen panel according to an embodiment of the present invention.

Thereinafter, the embodiments of the invention will be described in detail with reference to the following drawings. However, embodiments may be embodied in many different forms and should not be constructed as being limited to the exemplary embodiments set forth herein. In contrast, the embodiments were chosen and described in order to explain certain principles of the invention and their practical application, to thereby enable others skilled in the art to make and utilize various exemplary embodiments of the present invention as well as various alternatives and modifications thereof. In addition, in the drawings, the size and thickness of a device can be exaggerated for convenience, and like reference numerals refer to like elements throughout the specification. Besides, it will be understood that when a substrate or a component are referred to as being 'on' another layer or a base substrate, it can be directly on another layer, the substrate, or intervening layers.

FIG. 1 illustrates a schematic structural view of an in-cell capacitive touch screen panel according to an embodiment of the present invention.

Referring to FIG. 1, the in-cell capacitive touch screen panel according to the embodiment of the present invention comprises a color filter (CF) substrate 100, a thin film transistor (TFT) array substrate 200, and a liquid crystal layer 300 between the color filter substrate 100 and the thin film transistor array substrate 200.

The color filter substrate 100 comprises a first substrate 110, a color filter layer 120, a black matrix 130, a common electrode layer 140, a sensing electrode layer 150 and an isolated layer 160.

The first substrate 110 could, for example, be a transparent glass substrate or Polyethylene terephthalate substrate, but the present invention is not limited thereto.

The black matrix 130 is patterned on the first substrate 110. For example, the black matrix 130 is directly patterned on the first substrate 110.

The color filter layer 120 comprises a red color filter 122, a green color filter layer 124, and a blue color filter 126. The color filter layer 120 is patterned on the first substrate 110, and the color filter layer 120 is patterned on the black matrix 130. For example, the color filter layer 120 is formed directly patterned on the first substrate 110, and the color filter layer 120 is directly patterned on the black matrix 130. The present invention is not limited herein, for example, the black matrix 130 can be used to separated the red color filter 122, the green color filter layer 124, and the blue color filter 126 of the color filter layer 120; in other words, the color filter layer 120 is patterned on the first substrate 110, and the red color filter 122, the green color filter layer 124, and the blue color filter 126 are patterned between the black matrix 130.

The common electrode layer 140 is formed on the color filter layer 120. For example, the common electrode layer 140 is directly formed on the color filter layer 120. The common electrode layer 140 includes a plurality of common electrodes 142 and a plurality of touch driving electrodes 144 extending in a first direction (for example, the first direction is column direction.). For example, each the common electrodes 142 and each the touch driving electrodes 144 is strip shape, but the present invention is not limited thereto.

A sensing electrode layer 150 is formed on the common electrode layer 140. For example, an isolated layer 160 can be disposed between the sensing electrode layer 150 and the common electrode layer 140 to prevent the sensing electrode layer 150 and the common electrode layer 140 from contacting electrically each other. The sensing electrode layer 150 includes a plurality of touch sensing electrodes 152 extending in a second direction (for example, the first direction is row direction). For example, each the sensing electrodes 152 is strip shape, but the present invention is not limited thereto.

The common electrodes 142, the touch driving electrodes 144, and the touch sensing electrodes 152 can all be made of transparent conductive material, but the present invention is not limited thereto. For example, the common electrodes 142, the touch driving electrodes 144, and the touch sensing electrodes 152 can all be made of Indium-Tin Oxide (ITO).

It should be understood that the color filter substrate 100 according to the embodiment of the present invention further includes an alignment film layer and other suitable elements; however, these are not key points of the present invention, so that others skilled in the art can refer these to the related arts, and thus detailed description thereof will be omitted.

A thin film transistor (TFT) substrate 200 comprises a second substrate 210, a plurality of switching transistors 220, and a plurality of subpixel regions 230.

The second substrate 210 can be, for example, a transparent glass substrate or a Polyethylene terephthalate (PET) substrate, but the present invention is not limited.

The switching transistors 220, for example thin film transistor (TFT), are formed on the second substrate 210. For example, the switching transistors 220 are directly formed on the second substrate 210. Each the switching transistors 220 comprises a pixel electrode 222, and the pixel electrode 222 is arranged on a corresponding subpixel region 230.

It should be understood that the thin film transistor (TFT) substrate 200 according to the embodiment of the present invention further includes other suitable elements; however, these are not key points of the present invention so that others skilled in the art can refer these to the related arts, and thus detailed description thereof will be omitted.

The driving method for the in-cell capacitive touch screen panel according to the embodiment of the present invention will be described in detail with reference to the following. In the present embodiment, an image frame display time period T displayed by the in-cell capacitive touch screen panel is divided into a display driving time period T1 and a touch drive time period T2.

Further, specifically, the described above in detail is only one embodiment of the present invention. In other embodiments, both the common electrode layer 140 and the sensing electrode layer 150 can be arranged on the thin film transistor substrate 200; also, the common electrode layer 140 is arranged on the color filter substrate 100 and the sensing electrode layer 150 can be arranged on the thin film transistor substrate 200; also, the common electrode layer 140 is arranged on the thin film transistor substrate 200, and the sensing electrode layer 150 can be arranged on the color filter substrate 100.

Figure 2:
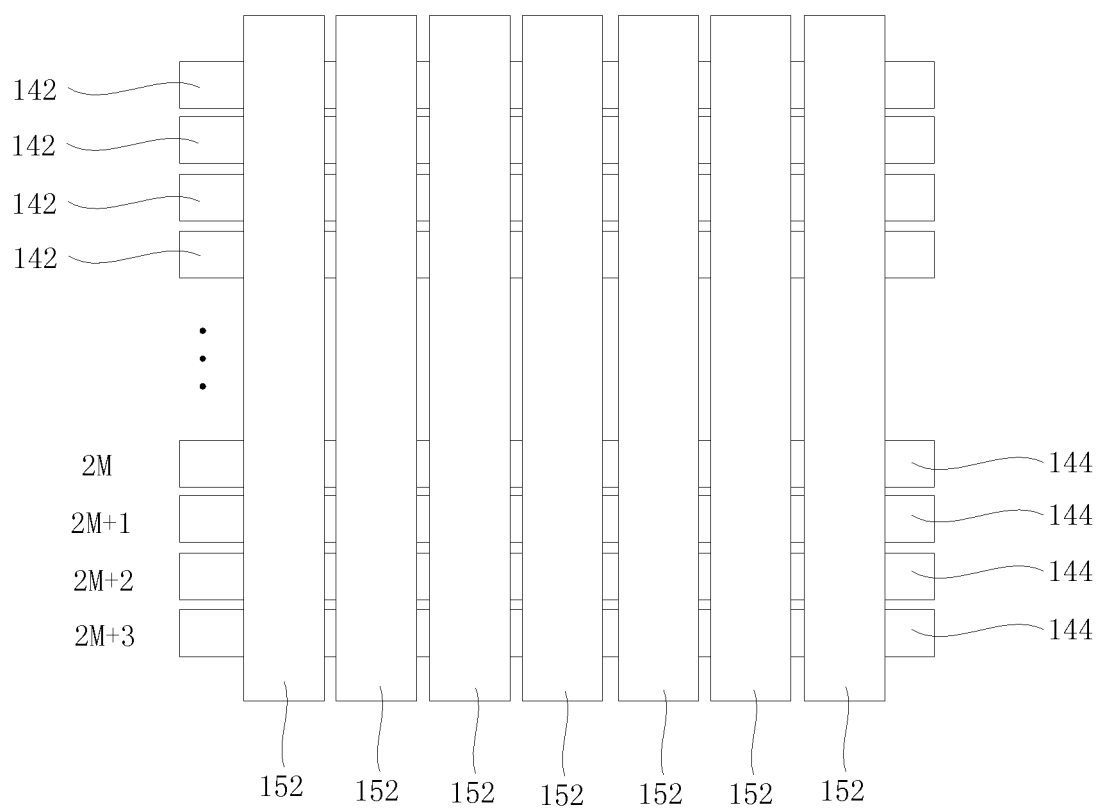
FIG. 2 is a plane view of a common electrode layer and a sensing electrode layer according to an embodiment of the present invention.

FIG. 2 illustrates a plane view of a common electrode layer and a sensing electrode layer according to an embodiment of the present invention.

Referring to FIG. 2, the driving method for the in-cell capacitive touch screen panel according to an embodiment of the present invention comprises:

providing the common electrode voltage for image display to each the common electrodes 142 and each the touch driving electrodes 144 within the display driving time period T1 of the N-th image frame display time period T; that is, the function of each the touch driving electrodes 144 is the same as the function of each the common electrodes 142 within the display driving time period T1 of the N-th image frame display time period T; in other words, each the touch driving electrodes 144 is used as a common electrode within the display driving time period T1 of the N-th image frame display time period T;

providing the common electrode voltage for image display to each the common electrodes 142 and 2M-th (In which, M is a integer) of the touch driving electrodes 144 within the touch drive time period T2 of the N-th image frame display time period T, and providing the touch driving voltage for touch driving to (2M+1)-th of the touch driving electrodes 144 within the touch drive time period T2 of the N-th image frame display time period T; that is, the function of 2M-th of the touch driving electrodes 144 is the same as each the common electrodes 142, but the function of (2M+1)-th of the touch driving electrodes 144 is not the same as each the common electrodes 142 within the touch drive time period T2 of the N-th image frame display time period T;

providing a common electrode voltage for image display to each the common electrodes 142 and each the touch driving electrodes 144 within the touch drive time period T1 of the (N+1)-th image frame display time period T as within the touch drive time period T1 of the N-th image frame. That is, the function of each the touch driving electrodes 144 is the same as each the common electrodes 142 within the touch drive time period T1 of the (N+1)-th image frame display time period T. In other words, each the touch driving electrodes 144 is used as a common electrode within the display driving time period T1 of the (N+1)-th image frame display time period T;

However, providing the common electrode voltage for image display to each the common electrodes 142 and (2M+1)-th of the touch driving electrodes 144 within the touch drive time period T2 of the (N+1)-th image frame display time period T, and providing the touch driving voltage for touch driving to 2M-th of the touch driving electrodes 144 within the touch drive time period T2 of the (N+1)-th image frame display time period T. That is, the function of (2M+1)-th of the touch driving electrodes 144 is the same as each the common electrodes 142 within the touch drive time period T2 of the (N+1)-th image frame display time period T, but the function of 2M-th of the touch driving electrodes 144 is the same as each the common electrodes 142 within the touch drive time period T2 of the (N+1)-th image frame display time period T.

In the embodiment as described in the background art, the touch driving voltage for touch driving is higher than the common electrode voltage for image display.

As described above, according to an embodiment of the present invention, it is used to solve a non-uniform image displaying problem and avoid aging rate of liquid crystal molecules of the area corresponding to the touch driving electrodes being increased through alternately providing the touch driving voltage to each odd-numbered the touch driving electrodes and each even-numbered the touch driving electrodes within the touch drive time period of a neighboring image frame display time period.

Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

The invention claimed is:

1. A driving method for an in-cell capacitive touch screen panel, and the in-cell capacitive touch screen panel includes a plurality of common electrodes and a plurality of touch driving electrodes extending in a first direction, wherein the driving method for the in-cell capacitive touch screen panel comprising:

providing a common electrode voltage for image display to the common electrodes and each even-numbered one of the touch driving electrodes, and providing a touch driving voltage for touch driving to each odd-numbered one of the touch driving electrodes within a touch drive time period of a N-th image frame display time period;

providing the common electrode voltage to the common electrodes and each odd-numbered one of the touch driving electrodes, and providing the touch driving voltage to each even-numbered one of the touch driving electrodes within a touch drive time period of a (N+1)-th image frame display time period; and providing the common electrode voltage to the common electrodes and all the touch driving electrodes within a display driving time period of the N-th image frame display time period and within a display driving time period of the (N+1)-th image frame display time period, so that the common electrode voltage and the touch driving voltage are alternately provided to the odd-numbered one of the touch driving electrodes within the N-th image frame display time period and are provided with the common electrode voltage through the whole (N+1)-th image frame display time period, and the common electrode voltage and the touch driving voltage are alternately provided to the even-numbered one of the touch driving electrodes within the (N+1)-th image frame display time period and are provided with the common electrode voltage through the whole N-th image frame display time period, wherein each one of the N-th image frame display time period and the (N+1)-th image frame display time period comprises the display driving time period and the touch driving time period, and the common electrode voltage is different from the touch driving voltage.

2. The driving method for the in-cell capacitive touch screen panel of claim 1, wherein, the touch driving voltage is higher than the common electrode voltage.

3. An in-cell capacitive touch screen panel comprises a plurality of common electrodes and a plurality of touch driving electrodes extending in a first direction, wherein, the common electrodes and each even-numbered one of the touch driving electrodes are to be provided with a common electrode voltage of image displaying within a N-th image frame display time period, and each odd-numbered one of the touch driving electrodes are to be provided with a touch driving voltage of touch driving within a touch drive time period of a N-th image frame display time period; the plurality of the common electrodes and each odd-numbered one of the touch driving electrodes are to be provided with the common electrode voltage within a (N+1)-th image frame display time period, and each even-numbered one of the touch driving electrodes are to be provided with the touch driving voltage within a touch drive time period of a (N+1)-th image frame display time period, wherein the common electrodes and all the touch driving electrodes are provided with the common electrode voltage within a display driving time period of the N-th image frame display time period and within a display driving time period of the (N+1)-th image frame display time period, so that the common electrode voltage and the touch driving voltage are alternately provided to the odd-numbered one of the touch driving electrodes within the N-th image frame display time period and are provided with the common electrode voltage through the whole (N+1)-th image frame display time period, and the common electrode voltage and the touch driving voltage are alternately provided to the even-numbered one of the touch driving electrodes within the (N+1)-th image frame display time period and are provided with the common electrode voltage through the whole N-th image frame display time period, wherein each one of the N-th image frame display time period and the (N+1)-th image frame display time period comprises the display driving time period and the touch driving time period, and the common electrode voltage is different from the touch driving voltage.

4. The in-cell capacitive touch screen panel of claim 3, wherein, the touch driving voltage is higher than the common electrode voltage.

\* \* \* \* \*